United States Patent

Gunther

[15] 3,642,497

[45] Feb. 15, 1972

[54] FLAVORING COMPOSITIONS PRODUCED BY REACTING HYDROGEN SULFIDE WITH A PENTOSE

[72] Inventor: Roland Gunther, Princeton Junction, N.J.

[73] Assignee: Fritzsche Dodge & Olcott Inc., New York, N.Y.

[22] Filed: July 26, 1971

[21] Appl. No.: 161,500

Related U.S. Application Data

[63] Continuation-in-part of Ser. No. 730,665, May 20, 1968, abandoned, Continuation-in-part of Ser. No. 746,240, July 22, 1968, abandoned.

[52] U.S. Cl....................99/140 R, 260/209 R, 260/126 R
[51] Int. Cl. ........................................................A23l 1/26
[58] Field of Search..........................99/140; 260/209, 126

[56] References Cited

UNITED STATES PATENTS

| | | | |
|---|---|---|---|
| 2,934,437 | 4/1960 | Morton et al. | 99/140 |
| 3,394,015 | 7/1968 | Giacino | 99/140 |

FOREIGN PATENTS OR APPLICATIONS 276,602  10/1951  Switzerland

OTHER PUBLICATIONS

Mecchi et al, "Origin of Hydrogen Sulfide in Heated Chicken Muscle," Journal of Food Science, Vol. 29, 1964 pp. 393–399

*Primary Examiner*—Morris O. Wolk
*Assistant Examiner*—Warren Bovee
*Attorney*—Frank M. Nolan

[57] ABSTRACT

The flavoring compositions produced by the reaction of a pentose with hydrogen sulfide possess potent flavoring characteristics even though the reactants from which they are produced are markedly different from such compositions. For example, certain such compositions possess a characteristic meat flavor in a concentration as low as one part in 10,000 notwithstanding that one of the components for producing such compositions has an obnoxious odor. Such meat flavoring compositions significantly increase the degree of palatability of nonmeat protein.

36 Claims, No Drawings

FLAVORING COMPOSITIONS PRODUCED BY REACTING HYDROGEN SULFIDE WITH A PENTOSE

This application is a continuation-in-part of the pending applications Ser. No. 730,665, filed May 20, 1968, now abandoned, and Ser. No. 746,240, filed July 22, 1968, now abandoned.

This invention relates to flavoring compositions and more particularly to flavoring compositions for foods and the processes for producing them.

The increasing need to supply a growing world population with proteinaceous foods has led nutritionists to advocate nonmeat sources because their per acre yield of usable protein is so much higher than that of meat. However, tradition and taste preferences present formidable opposition to the acceptance of plant proteins as major components of such foodstuffs.

In accordance with this invention, flavoring compositions are provided which significantly increase the degree of palatability of nonmeat protein. This addition renders such nonmeat proteins—which are nutritionally equivalent to proteins in meat—particularly acceptable as food.

The flavoring compositions of this invention are prepared by reacting a pentose such as ribose, xylose, arabinose and lyxose with hydrogen sulfide. Instead of a single pentose a plurality of pentoses may be reacted with the hydrogen sulfide. The reactants are desirably heated to a temperature between 90° C. and that at which the pentose decomposes. Preferably, the temperature is maintained between 100° and 120° C. Desirably, a pressure above atmospheric is employed, such as a pressure of 20 to 40 pounds per square inch. This pressure may be obtained in a closed Parr pressure reactor or other similar container. The reaction may be conducted in the presence of a solvent for the pentose such as water.

While satisfactory flavor reaction products are obtained with a wide range of proportions of reactants, preferred reaction products are produced with a ratio of 1 mole of hydrogen sulfide to about 2 moles of pentose.

Alternatively, the flavoring compositions of this invention may be prepared by producing the hydrogen sulfide in situ with a solid inorganic sulfide in the present of an acid. More particularly, in this alternative procedure, the pentose is reacted with a solid inorganic sulfide. Desirably, the solid inorganic sulfide is nontoxic. In addition, it is desirable that the anion of the acid and the cation of the sulfide combine to produce a nontoxic compound. Preferably, the reactants employed to produce the flavoring composition and any additional reaction compound produced comply with all government regulations relating to food such as those compiled by the United States Food and Drug Administration for foodstuffs. Conveniently, the inorganic sulfide, pentose and acid are heated together in a sealed container such as a sealed Parr Reactor at a temperature above 100° C. and less than that at which any decomposition occurred, such as 120° C. The heating is maintained until the flavoring composition is produced which is manifested by a pleasant odor such as a meaty odor. Usually a period of about 1 to 30 minutes is sufficient for this purpose.

Examples of pentoses are ribose, xylose, arabinose and lyxose. Instead of a single pentose a plurality of pentoses may be employed.

Examples of inorganic sulfides are ammonium sulfide, sodium sulfide, potassium sulfide and calcium sulfide. One or a plurality of inorganic sulfides may be employed.

Examples of the acid are carboxylic acids such acetic acid, propionic acid, palmitic acid, succinic acid, fumaric acid, adipic acid and oleic acid; hydroxy carboxylic acids such as lactic acid, malic acid, citric acid and tartaric acid; dicarboxylicamino acids such as glutamic acid; and mineral acids such as hydrochloric acid, sulfuric acid and phosphoric acid.

The reactants are desirably heated to a temperature between 90 ° C. and that at which the pentose decomposes. Preferably the temperature is maintained between 100° C. and 120 C. Desirably, a pressure above atmospheric is employed such as a pressure of 20 to 40 pounds per square inch. This pressure may be obtained in a closed Parr Pressure Reactor or other similar container. The reaction may be conducted in the presence of a solvent for the pentose such as water.

While satisfactory flavoring compositions are obtained with a wide range proportion of reactants, preferred flavoring compositions are produced with the ratio of 1 mole of inorganic sulfide to about 2 moles of pentose.

It is desirable not to use reactants for production of flavoring compositions which contain undesired substances or which would be retained after a reaction has been completed. Desirably reactants should be avoided which produce compositions in addition to the desired flavoring compositions, and which might mask or otherwise interfere with the desired flavor which stems from the flavoring compositions.

The flavor reaction products may be incorporated in any comestible. For example, such reactant products may be uniformly distributed in vegetable proteins such as those described in *Food Technology*, Vol. 21, pp. 168–171, Feb. 1967, in fish protein concentrate such as that described in *Food Technology*, Vol. 21, pp. 1604–1610, Dec., 1967, or in foods for domesticated animals. Such reaction products are particularly useful in meat substitute foods. While the quantity of such reaction products employed may vary over wide limits, a proportion by weight of one part of reaction product to 500 to 100,000 parts of comestible and preferably one part of reaction product to 2000 to 4000 parts of comestible may be used.

A more comprehensive understanding of this invention is obtained by reference to the following examples:

EXAMPLE I 303 grams of xylose (99 percent) (2 moles) are dissolved in 250 ml. of water by heating in an open Parr pressure reactor. The reactor is closed, the stirrer turned on and the temperature brought to 120° C. 34 Grams (1 mole) of hydrogen sulfide are introduced with constant stirring over a period of 3 hours.

The reactor is vented and the contents cooled. The product has a pronounced meat aroma and flavor when diluted in a ratio of 1:10,000 with water.

EXAMPLE II

3 Grams of pure ribose (0.02 mole) is dissolved in 2.5 ml. of water by heating in an open Parr pressure reactor. The reactor is closed, the stirrer turned on and the temperature brought to 120° C. 0.34 gram (0.01 mole) of hydrogen sulfide is introduced with constant stirring over a period of one-half hour.

The reactor is vented and the contents cooled. The product has a pronounced meat aroma and flavor when diluted in a ratio of 1:10,000 with water.

EXAMPLE III

Example II is repeated except that 3 grams (0.02 mole) of arabinose are employed instead of the 3 grams of ribose.

EXAMPLE IV

Example II is repeated except that 3 grams (0.02 mole) of lyxose are employed instead of the 3 grams of ribose.

EXAMPLE V

One gram of the reaction product of Example I is thoroughly mixed with 3 kilograms of the fish protein concentrate described in *Food Technology*, Vol. 21, pp. 1604–1610, Dec., 1967. The mixing is performed in a food blender. The incorporated reaction product imparts a pleasing meatlike taste to the resulting mixture.

EXAMPLE VI 4.9 grams of glutamic acid, 5 g. of 22 percent ammonium sulfide solution and 5 g. of xylose are placed in a Parr reactor. The Parr reactor is sealed and heated at 120° C. for 10 minutes. A flavoring composition is produced which gives a pleasant roasted meat flavor.

Alternatively 4.7 g. of glutamic acid, 4.0 g. of sodium sulfide enneahydrate, 5 g. of xylose and 5 ml. of water are heated in a sealed Parr reactor at 120° C. for 10 minutes. A similar flavoring composition is produced by this reaction.

EXAMPLE VII 4.7 grams of glutamic acid, 3.3 g. of potassium sulfide pentahydrate, 5 g. of xylose and 5 ml. of water are heated in a sealed vessel at 120° C. for 10 minutes. The flavoring composition produced has a pleasant flavor.

EXAMPLE VIII 4 grams of lactic acid in a 75 percent aqueous solution, 5 g. of ammonium sulfide in a 22 percent solution and 5 g. of xylose are heated together in a Parr reactor to 120° C. for 10 minutes. The flavoring composition produced has a pleasant meat flavor.

In some cases an insoluble composition is produced. This is illustrated with a pentose such as xylose, calcium sulfide and either sulfuric acid or phosphoric acid. Both leave an insoluble salt which can easily be separated to leave essentially a pure flavoring composition having a definite meat flavor. When sodium sulfide is reacted with xylose and hydrochloric acid, a flavoring composition and sodium chloride are produced. The flavoring composition has a definite meat flavor. The reaction of sodium chloride, glutamic acid and a pentose such as xylose results in a flavoring composition containing monosodium glutamate. Both the composition and the monosodium glutamate individually contribute to the flavor. When xylose and ammonium sulfide are reacted in the presence of an eight fold excess of palmitic acid, a flavoring composition is produced which has a definite meaty flavor.

What is claimed is:

1. The reaction product of a pentose and hydrogen sulfide produced by reacting said pentose and hydrogen sulfide in the presence of a neutral or acidic medium at a temperature below the decomposition temperature of said pentose.

2. The reaction product of claim 1, in which the pentose is ribose.

3. The reaction product of claim 1 in which the pentose is xylose.

4. The reaction product of claim 1 in which the pentose is arabinose.

5. The reaction product of claim 1 in which the pentose is lyxose.

6. The process of producing the reaction product of claim 1 which consists essentially of reacting hydrogen sulfide with a pentose in the presence of a neutral or acidic medium at a temperature below the decomposition temperature of said pentose.

7. The process of claim 6 in which the neutral or acidic medium is water.

8. The process of claim 6 in which the reaction is conducted at a temperature between 90° C. and the decomposition temperature of the pentose.

9. The process of claim 6 in which the reaction is conducted at a pressure above atmospheric.

10. The process of claim 6 in which the pentose is ribose.

11. The process of claim 6 in which the pentose is xylose.

12. The process of claim 6 in which the pentose is arabinose.

13. The process of claim 6 in which the pentose is lyxose.

14. A comestible having incorporated therein a reaction product of claim 1.

15. A comestible of claim 14 in which the comestible is vegetable protein.

16. A comestible of claim 14 in which the comestible is fish protein.

17. The process of claim 6 in which the reaction is conducted at a temperature below 120° C.

18. The process of claim 6 in which the reaction is conducted at a temperature between 90° C. and 120° C.

19. The process of claim 6 in which the hydrogen sulfide is produced in situ by a solid inorganic sulfide in the presence of an acid.

20. The process of claim 19 in which the anion of the acid and the cation of the sulfide combine to produce a nontoxic compound.

21. The process of claim 19 in which the inorganic sulfide is nontoxic.

22. The process of claim 19 in which the acid is a carboxylic acid.

23. The process of claim 19 in which the acid is an hydroxy carboxylic acid.

24. The process of claim 19 in which the acid is a dicarboxylic amino acid.

25. The process of claim 19 in which the acid is glutamic acid.

26. The process of claim 19 in which the acid is acetic acid.

27. The process of claim 19 in which the acid is lactic acid.

28. The process of claim 19 in which the acid is malic acid.

29. The process of claim 19 in which the inorganic sulfide is ammonium sulfide.

30. The process of claim 19 in which the inorganic sulfide is sodium sulfide.

31. The process of claim 19 in which the inorganic sulfide is potassium sulfide.

32. The process of claim 19 in which the inorganic sulfide is calcium sulfide.

33. The process of claim 19 in which the pentose is xylose.

34. The process of claim 19 in which the pentose is xylose and the inorganic sulfide is ammonium sulfide.

35. The process of claim 19 in which the pentose is xylose, the inorganic sulfide is ammonium sulfide and the acid is glutamic acid.

36. The process of claim 19 in which the pressure at which the reaction is conducted is 20 to 40 pounds per square inch.

* * * * *